United States Patent [19]

Duval et al.

[11] Patent Number: 5,769,454
[45] Date of Patent: Jun. 23, 1998

[54] DEVICE FOR POSITIONING AN AUTOMOBILE VEHICLE STEERING COLUMN IN THE EVENT OF AN IMPACT

[75] Inventors: Benoît Duval; Frédéric Gentet, both of Vendome; Pascal Millet, Meslay, all of France

[73] Assignee: Lem Forder Nacam SA, Vendome, France

[21] Appl. No.: 841,686

[22] Filed: Apr. 30, 1997

[30] Foreign Application Priority Data

May 3, 1996 [FR] France ................................. 96 05675

[51] Int. Cl.⁶ .................................................. B62D 1/11
[52] U.S. Cl. ............................................. 280/777; 74/493
[58] Field of Search .................................. 280/777, 775, 280/731; 74/492, 493; 180/274

[56] References Cited

U.S. PATENT DOCUMENTS 4,946,195  8/1990  Ioka et al. ............................. 280/777
5,346,255  9/1994  Schäfer et al. ......................... 280/775
5,507,521  4/1996  Steffeus, Jr. ........................... 280/775
5,673,937  10/1997 Feure et al. ............................ 280/777
5,685,564  11/1997 Iijima et al. ........................... 280/777

FOREIGN PATENT DOCUMENTS 2 244 032  11/1991  United Kingdom .................. 280/777

*Primary Examiner*—Christopher P. Ellis
*Attorney, Agent, or Firm*—Laubscher & Laubscher

[57] ABSTRACT

A steering column includes a steering shaft freely rotatable in a tube-body disposed in a support member attached to a chassis of the vehicle. The tube-body is locked by a system for adjusting its position. The positioning device comprises an additional guide system for the tube-body in the event of an impact such that the angle of the steering shaft and the steering wheel of the vehicle to the horizontal plane is smaller after retraction of the steering wheel in order to allow correct functioning of the air-bag.

8 Claims, 3 Drawing Sheets

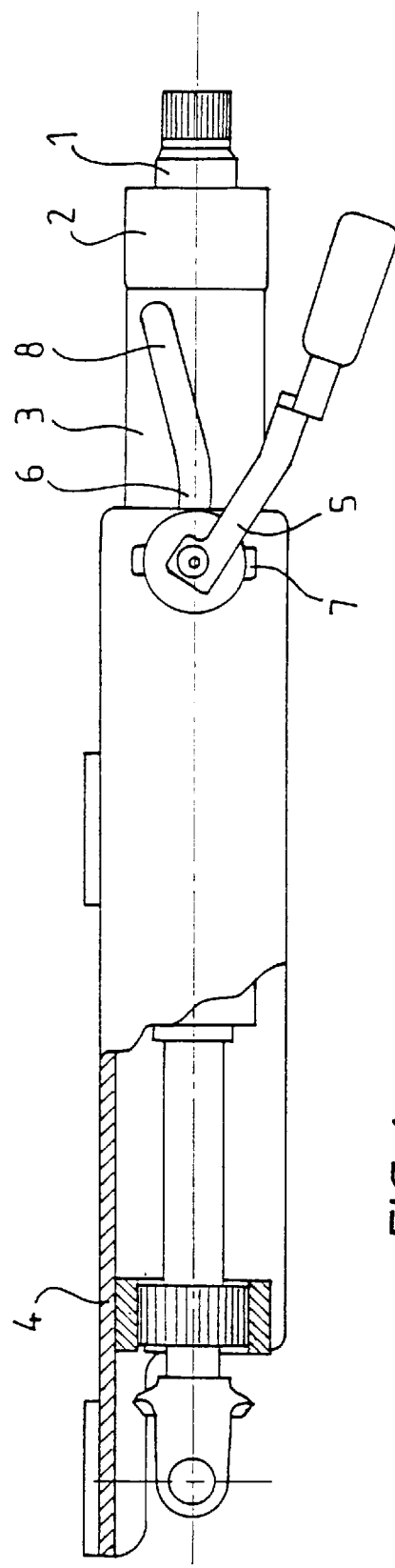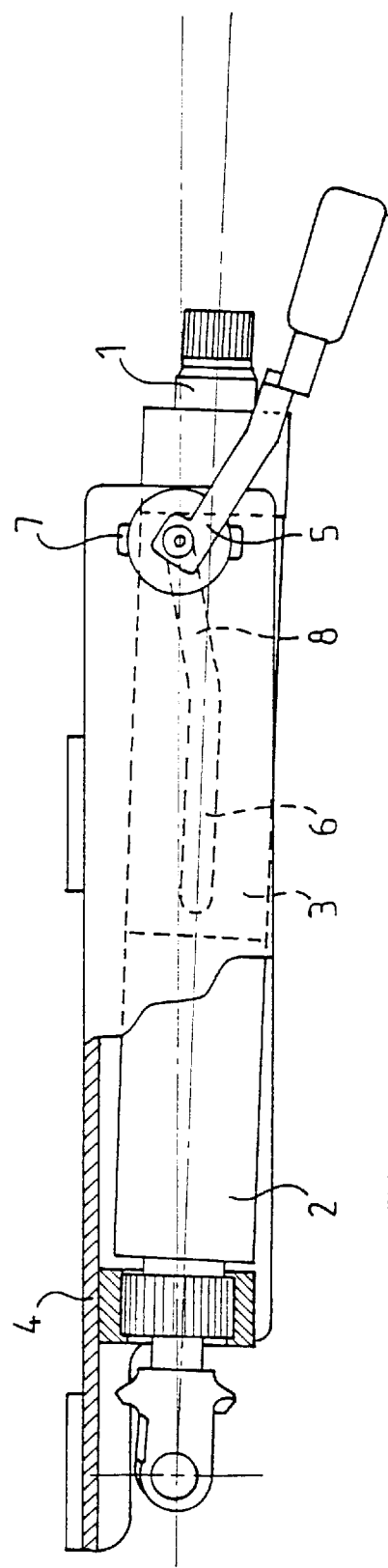

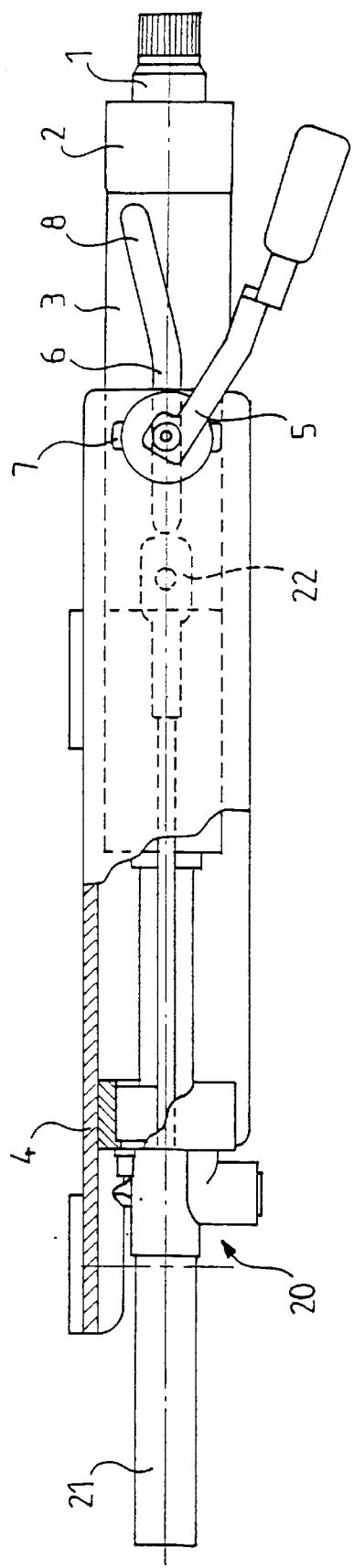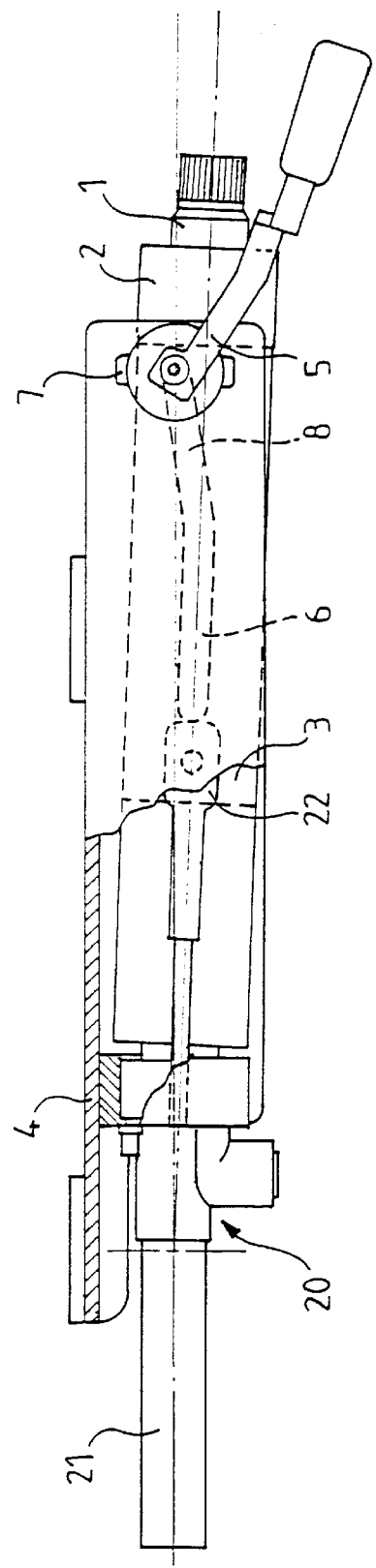

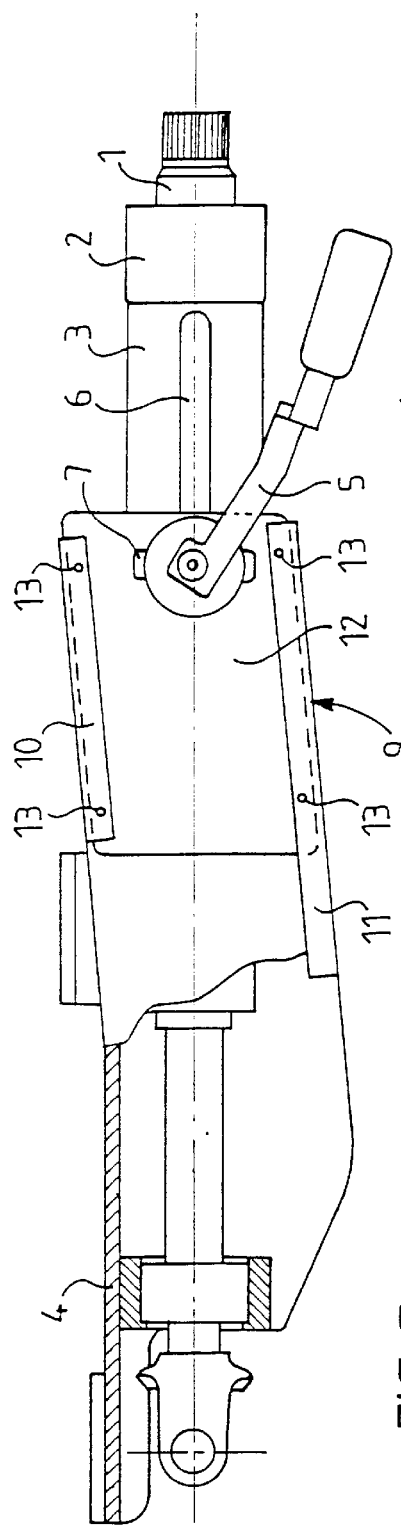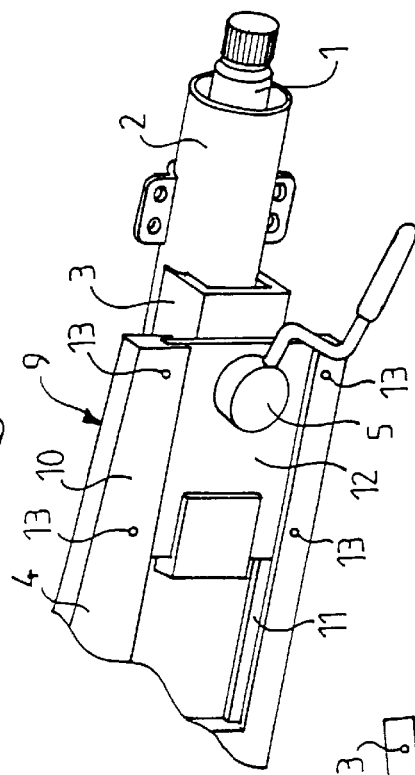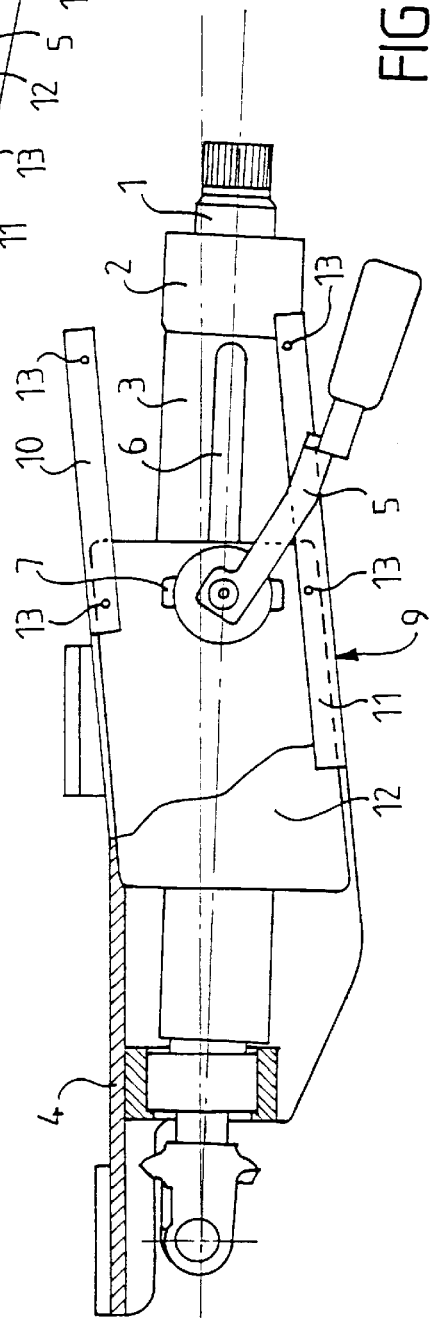

DEVICE FOR POSITIONING AN AUTOMOBILE VEHICLE STEERING COLUMN IN THE EVENT OF AN IMPACT

BACKGROUND OF THE INVENTION

1. Field of the Invention

The present invention concerns a device for positioning an automobile vehicle steering column in the event of an impact.

2. Description of the Prior Art

The installation of an automobile vehicle steering column inside the passenger compartment has to comply with ergonomic criteria whereby the angle of the steering column to the horizontal must be in the order of 30°. The increasingly severe requirements for protection of the driver in the event of an accident and in particular in the event of a head-on impact have led manufacturers to provide a safety air cushion system, usually called an "air-bag", which inflates virtually instantaneously in the event of an impact in order to protect the driver by covering the steering wheel. For this system to operate optimally, it is necessary for the steering wheel to be lowered to an angle of less than 20° to the horizontal.

OBJECT OF THE INVENTION

The main object of this invention is to propose a device for positioning an automobile vehicle steering column in the event of an impact which operates so that the angle of the steering column and the steering wheel to the horizontal plane has the value required for optimal functioning of the "air-bag", this angle being different from the angle required for normal utilization.

SUMMARY OF THE INVENTION

According to the invention, the device for positioning an automobile vehicle steering column in the event of an impact is associated with a steering column including a steering shaft which is freely rotatable in a tube-body. The tube-body is disposed in a support member which is attached to a chassis of the vehicle. The tube-body is adjustable in height and in depth in the vertical plane and is locked in the support member by a system for adjusting the position of the steering column. The positioning device of the invention comprises additional guide means for the tube-body in the event of an impact comprising an additional guide slide on the tube-body, which comprises an additional guide slide on the tube-body, such that an angle of the steering shaft and the steering wheel of the vehicle to a horizontal plane is smaller after retraction of the steering wheel in order to allow correct functioning of an air-bag.

In another embodiment of the invention, the additional guide means comprise an additional guide slide on the support member.

In the embodiments of the invention, it is particularly interesting that the steering column is retracted by a pyrotechnic piston and cylinder actuator which is controlled by a collision sensor. In this architecture, the cylinder of the pyrotechnic actuator is mounted on the support member and a rod end of the actuator piston is connected to the tube-body.

In a particularly interesting structure of the invention, the additional guide slide is on a reinforcing member of the tube-body, aligned with a depthwise adjustment slide of the steering column. The additional guide slide is inclined to the depthwise adjustment slide at an angle allowing correct functioning of the air-bag after retraction.

In another particularly advantageous architecture of the invention, the additional guide slide is on the support member. This additional guide slide comprises two U-shape guide members disposed parallel to each other on the support member in such manner as to receive and hold a plate carried by the reinforcing member of the tube-body. The plate is attached to the two U-shape guide members by fusible pins. The two guide members are inclined to the support member at an angle which allows correct functioning of the air-bag after retraction due to breaking of the fusible pins caused by the impact. This retraction results from sliding of the plate in the two U-shaped guide members.

Thus the device in accordance with the invention for positioning an automobile vehicle steering column in the event of an impact has the advantage of positioning the steering column at a smaller angle to the horizontal in the event of an impact so that the air-bag functions optimally. The invention also has the advantage of allowing a disposition of the steering column for normal utilization that complies totally with ergonomic conditions. Finally, the device of the invention can be adapted to and mounted in new or existing architecture of automobile vehicle steering column very easily.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 1 is a fragmentary axial and vertical sectional view of an automobile vehicle steering column fitted with a positioning device of the invention, in normal use, with no impact;

FIG. 2 is a view analogous to FIG. 1 after an impact and retraction of the steering column;

FIG. 3 is a view analogous to FIG. 1 of another embodiment of the invention in normal use, with no impact FIG. 4 is a view analogous to FIG. 3 after an impact and retraction of the steering column;

FIG. 5 is a view analogous to FIG. 1 of another embodiment of the invention in normal use, with no impact;

FIG. 6 is a view analogous to FIG. 5 after an impact and retraction of the steering column; and FIG. 7 is a fragmentary perspective view corresponding to FIG. 5.

DESCRIPTION OF THE PREFERRED EMBODIMENT

As can be seen in the various figures, the automobile vehicle steering column includes a steering shaft 1 which is freely rotatable in a tube-body 2. The tube-body 2 is disposed in a support member 4 which is attached to the chassis of the automobile vehicle. The tube-body 2 is adjustable in height and in depth in the vertical plane and is locked in the support member by a system 5 for adjusting the position of said steering column.

The device of the invention for positioning an automobile vehicle steering column in the event of an impact comprises an additional guide means for the tube-body 2. These additional guide means are such that the angle of the steering shaft 1 and the steering wheel to the horizontal plane is smaller after retraction of the steering wheel, in order to enable correct operation of a safety air cushion under optimal conditions. This safety air cushion is usually called an air-bag, and this term will be used in the remainder of the description.

In the embodiments of the invention shown in FIGS. 1 through 4, the additional guide means comprise an additional guide slide 8 which is made in the tube-body 2. To be more precise, the additional guide slide 8 is on a reinforcing square 3 attached to the tube-body 2. The additional guide slide 8 is aligned with the depthwise adjustment slide 6 of the system 5 for adjusting the position of the steering column. The position adjustment system 5 also includes a heightwise adjustment slide 7 made in the support member 4. In accordance with the essential feature of the invention, the additional guide slide 8 is inclined to the depthwise adjustment slide 6 at an angle enabling correct operation of the air-bag under optimal conditions after retraction of the steering column.

The position of the steering column after an impact and retraction is shown clearly in FIGS. 2 and 4 where the new inclined position of the steering column relative to the horizontal can be seen.

In the embodiment of the invention shown in FIGS. 3 and 4, the steering column is retracted by a pyrotechnic piston and cylinder actuator 20 which is controlled by a collision sensor. In this embodiment, cylinder 21 of the pyrotechnic actuator 20 is mounted on the support member 4, and piston rod end 22 is connected to the tube-body 2. In the event of an impact of predetermined magnitudes, the collision sensor actuates the pyrotechnic actuator so that the gas generated by the explosion impinges on the piston to maneuver the tube-body 2.

In the embodiment of the invention shown in FIGS. 5 through 7 the additional guide means comprise an additional guide slide 9 which is disposed on the support member 4. The additional guide slide 9 on the support member 4 comprises two U-shape guide members 10 and 11, the guide member 10 being at the top and the guide member 11 at the bottom. The two guide members 10 and 11 are fitted parallel to each other and are disposed in such a manner that they can receive and hold a plate 12. The plate 12 is carried by the reinforcing square 3 of the tube-body 2 to which it is attached. The plate 12 is attached to the tube U-shape guide members 10 and 11 by fusible pins 13. Moreover, the two guide members 10 and 11 are inclined to the support member 4 at an angle allowing the air-bag to function under optimal conditions after retraction of the steering column. This retraction is made possible by the breaking of the fusible pins 13 as a result of the impact. The retraction is guided by the plate 12 sliding in the two U-shape guide members 10 and 11.

What we claim is:

1. A device for positioning an automobile vehicle steering column in the event of an impact, said steering column including a steering shaft freely rotatable in a tube-body disposed in a support member attached to a chassis of said vehicle, said tube-body being locked in said support member by a system for adjusting the position of said steering column, and said positioning device comprising additional guide means for said tube-body in the event of an impact, said additional guide means comprising an additional guide slide on said tube-body, such that an angle of said steering shaft and a steering wheel of said vehicle to a horizontal plane is smaller after retraction of said steering wheel in order to allow correct functioning of an air-bag.

2. The positioning device claimed in claim 1 wherein said steering column is retracted by a pyrotechnic piston and cylinder actuator controlled by a collision sensor.

3. The positioning device claimed in claim 2 wherein said cylinder is mounted on said support member and a rod end of said piston is connected to said tube-body.

4. The positioning device claimed in claim 1 wherein said additional guide slide is on a reinforcing member of said tube-body, aligned with a depthwise adjustment slide of said steering column, and said additional guide slide is inclined to said depthwise adjustment slide at an angle allowing correct functioning of said air-bag after retraction.

5. A device for positioning an automobile vehicle steering column in the event of an impact, said steering column including a steering shaft freely rotatable in a tube-body disposed in a support member attached to a chassis of said vehicle, said tube-body being locked in said support member by a system for adjusting the position of said steering column, and said positioning device comprising additional guide means for said tube-body in the event of an impact, said additional guide means comprising an additional guide slide on said support member such that the angle of said steering column and a steering wheel of said vehicle to a horizontal plane is smaller after retraction of said steering wheel in order to allow correct functioning of an air-bag.

6. The positioning device claimed in claim 5 wherein said steering column is retracted by a pyrotechnic piston and cylinder actuator controlled by a collision sensor.

7. The positioning device claimed in claim 5 wherein said additional guide slide is on said support member and comprises two U-shape guide members disposed parallel to each other on said support member in such manner as to receive and hold a plate carried by a reinforcing member of said tube-body, said plate being attached to said two U-shape guide members by fusible pins; said two guide members being inclined to said support member at an angle allowing correct functioning of said air-bag after retraction due to breaking of said fusible pins caused by said impact, said retraction resulting from sliding of said plate in said two U-shaped guide members.

8. The positioning device claimed in claim 7 wherein said steering column is retracted by a pyrotechnic piston and cylinder actuator controlled by a collision sensor, said cylinder is mounted on said support member, and a rod end of said piston is connected to said tube-body.

* * * * *